United States Patent
Bae et al.

(10) Patent No.: US 9,817,550 B2
(45) Date of Patent: Nov. 14, 2017

(54) SYSTEM FOR PROVIDING CLOUD STREAMING-BASED SERVICE MENU AND METHOD FOR SAME

(75) Inventors: Tae Meon Bae, Seoul (KR); Hyun Sig Na, Seo-Gu Incheon (KR); Sang Woo Rhie, Seoul (KR); Sang Bum Lee, Seoul (KR)

(73) Assignee: ENTRIX CO., LTD. (KR)

( * ) Notice: Subject to any disclaimer, the term of this patent is extended or adjusted under 35 U.S.C. 154(b) by 486 days.

(21) Appl. No.: 14/365,505

(22) PCT Filed: Apr. 30, 2012

(86) PCT No.: PCT/KR2012/003348
§ 371 (c)(1),
(2), (4) Date: Oct. 27, 2014

(87) PCT Pub. No.: WO2013/089325
PCT Pub. Date: Jun. 20, 2013

(65) Prior Publication Data
US 2015/0074537 A1  Mar. 12, 2015

(30) Foreign Application Priority Data
Dec. 15, 2011 (KR) .................. 10-2011-0135450

(51) Int. Cl.
*G06F 15/00* (2006.01)
*G06F 13/00* (2006.01)
(Continued)

(52) U.S. Cl.
CPC .......... *G06F 3/0482* (2013.01); *G06Q 50/10* (2013.01); *H04L 65/4084* (2013.01); *H04L 67/02* (2013.01); *H04L 67/1002* (2013.01)

(58) Field of Classification Search
CPC .................. H04N 21/2387; G06F 3/0487
(Continued)

(56) References Cited

U.S. PATENT DOCUMENTS

2010/0281364 A1* 11/2010 Sidman ............. G06F 17/30595
715/713
2011/0314386 A1* 12/2011 Jeong .................... G06F 3/0487
715/741
(Continued)

FOREIGN PATENT DOCUMENTS

CN         1941900 A       4/2007
CN         101126978 A     2/2008
(Continued)

OTHER PUBLICATIONS

Office Action in Chinese Patent Application No. 201280061852.0, dated Sep. 29, 2016.
(Continued)

*Primary Examiner* — Kevin Nguyen
(74) *Attorney, Agent, or Firm* — Scarinci Hollenbeck

(57) ABSTRACT

A system for providing a cloud streaming-based service menu, a method and a terminal device. The terminal device selects a particular step in a step-by-step service menu to make a request for driving a content and the service device, in response to the request, provides content access information and menu step information corresponding to the particular step selected and initializes a step in the step-by-step service menu provided to the terminal device for switching a state of the service menu to a state in which an additional access of another terminal device is possible, so as to provide the initialized step-by-step service menu to another initially accessed terminal device. When the terminal device re-accesses, the service device will provide the service menu of the particular step corresponding to the menu step information to another accessed terminal device.

9 Claims, 7 Drawing Sheets

(51) Int. Cl.
*G06F 3/0482* (2013.01)
*G06Q 50/10* (2012.01)
*H04L 29/08* (2006.01)
*H04L 29/06* (2006.01)

(58) Field of Classification Search
USPC .............................. 715/738, 741, 713, 745
See application file for complete search history.

(56) References Cited

U.S. PATENT DOCUMENTS

2013/0132854 A1* 5/2013 Raleigh ................ G06F 3/0482
 715/738
2013/0347044 A1* 12/2013 Lee .................... H04N 21/2387
 725/88
2015/0280983 A1* 10/2015 Staykoff ................ H04W 4/14
 709/226
2015/0381744 A1* 12/2015 Na ....................... G06F 9/5072
 709/203

FOREIGN PATENT DOCUMENTS

| CN | 101635635 A | 1/2010 |
|---|---|---|
| JP | 2005-236780 | 9/2005 |
| JP | 3829125 | 10/2006 |
| KR | 1020030090130 | 11/2003 |
| KR | 100664227 | 12/2006 |
| KR | 1020090001499 | 1/2009 |
| KR | 1020090070952 | 7/2009 |
| KR | 1020110009587 | 1/2011 |

OTHER PUBLICATIONS

Notice of Allowance in Korean Patent Application No. 10-2011-0135450, dated Mar. 22, 2017.

* cited by examiner

SYSTEM FOR PROVIDING CLOUD STREAMING-BASED SERVICE MENU AND METHOD FOR SAME

BACKGROUND OF THE INVENTION

1. Field of the Invention

The present disclosure relates to a method of providing a service menu based on cloud streaming, and more particularly to a cloud streaming-based service menu providing system, a method thereof, a service device, and an operation method thereof, a terminal device, and an operation method thereof which, when a request for driving a content is received from a terminal device based on a step-by-step service menu, initialize a step of a service menu provided to the terminal device to maintain a state of the service menu as a state where an additional access of another terminal device is possible until the driving of the corresponding content is completed, and provide a service menu of a step finally selected by the terminal device when the terminal device re-accesses, so as to guarantee service continuity.

2. Description of the Prior Art

Recently, screen virtualization technologies that enable a low performance device to execute an application requiring high performance are frequently suggested.

Among the technologies, a cloud streaming technology has been frequently suggested based on a game service. The cloud streaming technology compressing a screen into a video, streaming the video, and providing the video to a terminal device and the terminal device reproduces the screen, so that there is an effect of showing as if an application is executed in the terminal device.

In the cloud streaming-based service, it is required to simultaneously process many users and applications corresponding to the number of users should be executed in a server side.

Meanwhile, a server that provides a cloud streaming-based service is necessarily required to provide a service menu to provide a selection environment of a content which a user desires to use separately from a streaming service.

However, when a service menu applied to a conventional cloud streaming service is provided, the user should return to a menu screen to select a content after using a content or maintain an access state until a service ends, and accordingly, another user cannot access the service.

Accordingly, when the conventional cloud streaming service is provided to a plurality of users, a simultaneous access environment is not considered. As a result, a new method of providing a service menu to a plurality of users is required.

SUMMARY OF THE INVENTION

Accordingly, the present disclosure has been made to solve the above-mentioned problems occurring in the prior art, and an aspect of the present disclosure is to provide a simultaneous access environment to a plurality of terminal devices by, when a request for driving a content is received from a terminal device based on a step-by-step service menu, initializing a step of the service menu provided to the terminal device and maintaining a state of the service menu as a state where an additional access of another terminal device is possible until the driving of the corresponding content is completed.

In accordance with an aspect of the present disclosure, a system for providing a service menu based on cloud streaming is provided. The system includes: a service device configured to provide a step-by-step service menu for selecting a service, provide content access information and menu step information corresponding to a particular step when a request for driving a content according to a selection of the particular step of the service menu is made, and initialize a step of the service menu; and a terminal device configured to access the service device to receive the service menu, select the particular step of the service menu to make the request for driving the content, and terminate the access to the service device and receive the content based on the content access information when receiving the content access information and the menu step information from the service device in response to the request for driving the content, wherein, when another terminal device additionally accesses, the service device provides the initialized step-by-step service menu to the another terminal device, and, when the terminal device re-accesses, the service device provides the service menu of the particular step corresponding to the menu step information.

In accordance with another aspect of the present disclosure, a service device is provided. The service device includes: a service guidance processor configured to transmit a step-by-step service menu for selecting a service to a terminal device, and transmit content access information and menu step information corresponding to a particular step when a request for driving a content is received according to a selection of the particular step of the service menu from the terminal device; and a content driving processor configured to transmit the content when the terminal device accesses the content access information, wherein the service guidance processor initializes a step of the service menu transmitted to the terminal device and switch a state of the service menu to a state where an additional access of another terminal device is possible.

The service guidance processor may transmit the service menu of the particular step corresponding to the menu step information when the terminal device re-accesses.

In accordance with another aspect of the present disclosure, a terminal device is provided. The terminal device includes: a service selector configured to select a particular step of a step-by-step service menu provided from a service device according to an initial access to the service device to make a request for driving a content and receive content access information and menu step information corresponding to the particular step according to the request for driving the content; and a content receiver configured to, when the content access information is received from the service device, terminate the access to the service device to initialize a step of the service menu and receive the content based on the content access information.

When the terminal device re-accesses the service device based on the received menu step information, the service selector may receive the service menu of the particular step corresponding to the menu step information from the service device.

When the terminal device initially accesses another service device, the service selector may receive the service menu of the particular step corresponding to the menu step information from the another service device.

In accordance with another aspect of the present disclosure, a method of providing a service menu based on cloud streaming is provided. The method includes: providing a step-by-step service menu for selecting a service to an initially accessed terminal device by a service device; making a request for driving a content by selecting a particular step of the step-by-step service menu by the terminal device; when the request for driving the content is made, providing content access information and menu step information corresponding to the particular step to the terminal device by the service device; initializing a step of the service menu provided to the terminal device to switch a state of the service menu to a state where an additional access of another terminal device is possible, by the service device; receiving the content based on the content access information in a state where the terminal device terminates the access to the service device; and providing the initialized step-by-step service menu to another accessed terminal device by the service device.

The method may further include, when a re-access of the terminal device is identified, providing the service menu of the particular step corresponding to the menu step information.

In accordance with another aspect of the present disclosure, a method of operating a service device is provided. The method includes: transmitting a step-by-step service menu for selecting a service to a terminal device; when a request for driving a content according to a selection of a particular step of the service menu is received from the terminal device, transmitting content access information and menu step information corresponding to the particular step; and initializing a step of the service menu transmitted to the terminal device to switch a state of the service menu to a state where an access of another terminal device is possible.

The method may further include, after the initializing the step of the service menu, transmitting the initialized step-by-step service menu to the another terminal device.

The method may further include, after the initializing the step of the service menu, transmitting the service menu of the particular step corresponding to the menu step information when the terminal device re-accesses based on the provided menu step information.

In accordance with another aspect of the present disclosure, a method of operating a terminal device is provided. The method includes: receiving a step-by-step service menu from a service device according to an initial access to a service device; making a request for driving a content by selecting a particular step of the step-by-step service menu; receiving content access information and menu step information corresponding to the particular step according to the request for driving the content; and terminating the access to the service device to initialize a step of the service menu and receiving the content based on the content access information.

The method may further include, when the terminal device re-accesses, receiving the service menu of the particular step corresponding to the menu step information from the service device.

In accordance with another aspect of the present disclosure, a computer-readable recording medium including commands for executing a process is provided. The process includes: transmitting a step-by-step service menu for selecting a service to a terminal device; when receiving a request for driving a content according to a selection of a particular step of the service menu from the terminal device, transmitting content access information and menu step information corresponding to the particular step; and initializing a step of the service menu transmitted to the terminal device to switch a state of the service menu to a state where an access of another terminal device is possible.

Based on a cloud streaming-based service menu providing system according to the present disclosure, when a request for driving a content is received from a terminal device based on a step-by-step service menu, the step of the service menu provided to the terminal device is initialized and the service menu is maintained in a state where another terminal device can additionally access until the driving of the corresponding content is completed, so that a simultaneous access environment can be provided to a plurality of terminal devices. Further, when the terminal device re-accesses in the future, a service menu of a step which the terminal device finally selects is provided, so that service continuity is guaranteed to an individual terminal device.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, exemplary embodiments of the present disclosure will be described with reference to the accompanying drawings.

Figure 1:
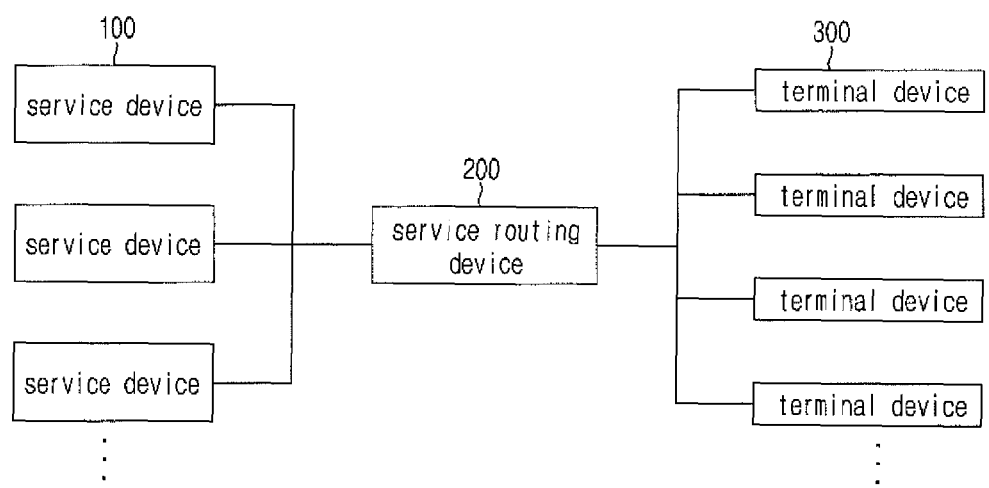
FIG. 1 schematically illustrates a configuration of a cloud streaming-based service menu providing system according to an embodiment of the present disclosure.

FIG. 1 schematically illustrates a configuration of a cloud streaming-based service menu providing system according to an embodiment of the present disclosure.

As illustrated in FIG. 1, the system includes a service device 100 for providing a service menu to a terminal device 300 to provide a cloud streaming service corresponding to a selected step, a service routing device 200 for inducing selective access of the terminal device 300 according to load states of a plurality of service devices 100, and the terminal device 300 for accessing the service device according to the access induction of the service routing device 200 to receive a cloud streaming service. The cloud streaming service refers to a technology in which the service device 100 executes a particular application according to a request of the terminal device 300, compresses a content, for example a screen, into a video according to the execution, and streams the video to provide it to the terminal device 300, and the terminal device 300 reproduces the screen, thereby creating an effect of showing as if the application is executed in the terminal device 100.

The service device 100 provides a step-by-step service menu for selecting a service to the terminal device 300.

Figure 2:
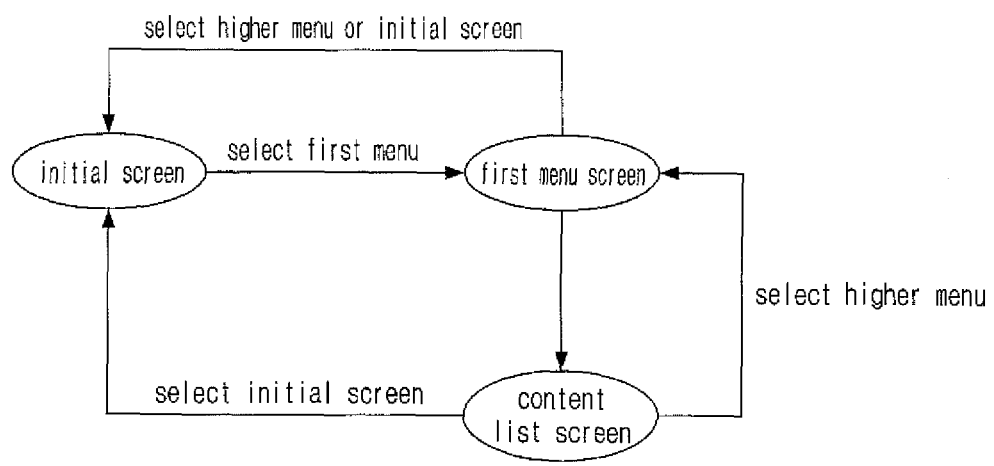
FIG. 2 is a view for describing a service menu according to an embodiment of the present disclosure.

More specifically, the service device 100 provides an initialized step-by-step service menu for selecting a service to the terminal device 300 which initially accesses the service device 100 according to an access induction of the service routing device 200. At this time, the service device 100 may provide a service menu to a limited number of terminal devices 300 and a service menu screen is provided to the terminal device 300 in a streaming type. The service menu is a service selection screen configured by a plurality of selectable steps, for example, an initial screen, a first menu screen according to the selection of the initial screen, and a content list screen through the selection of the first menu screen as illustrated in FIG. 2 and a user can move to a higher step or a lower step through a selection.

Further, the service device 100 receives a request for driving a content according to the selection of the service menu of a particular step from the terminal device 300.

More specifically, when the service device 100 receives a request for driving a content according to the selection of the service menu of a particular step from the terminal device 300, the service device 100 provides access information (for example, URL) of a particular service device, in which an application for providing the corresponding content is executed, to the terminal device 300. Further, the service device 100 additionally provides menu step information corresponding to the particular step of the service menu selected by the terminal device 300 to the terminal device 300 simultaneously with provision of the content access information. At this time, the menu step information may be directly transmitted to and stored in the terminal device 300 or may be transmitted to the service routing device 200 and used when the access of the terminal device 300 is induced.

Further, the service device 100 initializes the step of the service menu provided to the terminal device 300 to switch a state of the service menu to a state where another terminal device can further access.

More specifically, the service device 100 initializes the step of the service menu provided to the terminal device 300 and maintains a state of the service menu as a state where an additional access of another terminal device is possible until the driving of the content by the terminal device 300 is completed, so that the service device 100 provides a simultaneous access environment to a plurality of terminal devices.

Further, the service device 100 provides a service menu to a terminal device which accesses in a state where an additional access of another terminal device is possible.

More specifically, when another terminal device additionally accesses the service device 100 in a state where an additional access of another terminal device is possible according to the initialization of the step of the service menu, the service device 100 guides a cloud streaming service to another terminal device by providing the initialized step-by-step service menu to another terminal device. Further, when the terminal device 300 re-accesses the service device 100 based on the provided menu step information, the service device 100 may provide a guarantee of service continuity to the terminal device 300 by providing a service menu corresponding to the menu step information, that is, a service menu of a step finally selected by the terminal device 300.

Meanwhile, when the terminal device 300 accesses the service device 100 based on content access information, the service device 100 transmits a requested content by executing an application.

More specifically, when the terminal device 300 accesses the service device 100 based on the provided content access information and makes a request for the content, the service device 100 executes a VOD application which streams video/audio data if the content is a video/audio content, executes a game application which plays a game if the content is a game content to provide a content corresponding to a result value thereof to the terminal device 300, thereby reproducing a corresponding screen in the terminal device 300.

The terminal device 300 receives a step-by-step service menu according to an initial access to the service device 100.

More specifically, when the terminal device 300 initially accesses the service device 100 according to the access induction of the service routing device 200, the terminal device 300 receives a step-by-step service menu for using the cloud streaming service from the service device 100 in a streaming type. As described above, the service menu is a service selection screen configured by a plurality of selectable steps, for example, an initial screen, a first menu screen according to the selection of the initial screen, and a content list screen through the selection of the first menu screen as illustrated in FIG. 2 and a user can move to a higher step or a lower step through a selection.

Further, the terminal device 300 makes a request for driving a content by selecting a particular step based on the step-by-step service menu.

More specifically, the terminal device 300 makes a request for driving the content based on the step-by-step service menu received from the service device 100 and receives content access information, for example, access information (for example, URL) of a particular service device, in which an application for providing the corresponding content is executed, from the service device 100 according to the driving request. Further, the terminal device 300 additionally receives and stores menu step information corresponding to a particular step of the selected service menu simultaneously with the reception of the content access information.

In addition, the terminal device 300 receives the content based on the received content access information.

More specifically, when the terminal device 300 receives the content access information from the service device 100 according to the request for driving the content, the terminal device 300 terminates the access to the service device 100, accesses a particular service device having the application for providing the content among a plurality of service devices based on the content access information, and receives the corresponding content.

Further, the terminal device 300 re-accesses the service device 100 and receives the service menu of the particular step corresponding to the received menu step information from the service device 100.

More specifically, when the driving of the content is completed or when a user request is received, the terminal device 300 re-accesses the service device 100 based on the menu step information received from the service device 100 and receives a service menu of a finally selected step from the service device 100 according to the re-access, so as to receive a guarantee of service continuity. Meanwhile, when the terminal device 300 re-accesses the service device 100, the terminal device 300 accesses the service device 100 according to the access induction of the service routing device 200. In connection with this, when the service routing device 200 induces the terminal device 300 to access another service device, the terminal device 300 provides menu step information to another service device, so that the terminal device 300 may receive the service menu of the final access step from another service device in the same way as the service device 100 which the terminal device 300 previously accessed. At this time, the menu step information is stored in the terminal device 300, and is provided by the terminal device 300 when the terminal device 300 re-accesses the service device 100. Meanwhile, in another embodiment, menu step information provided from the service device 100 may be stored in the service routing device 300 instead of the terminal device 300. In connection with this, when the terminal device 300 makes a request for re-accessing the service device 100, the service routing device 200 operates as a subject to provide the menu step information, and accordingly, the service routing device 200 extracts the menu step information based on identification information of the accessed terminal device 300 and transmits the extracted menu step information to the service device 100 which the terminal device 300 accesses, so that the terminal device 300 may receive the service menu of the finally selected step.

Hereinafter, a more detailed configuration of the service device 100 according to an embodiment of the present disclosure will be described with reference to FIG. 3.

Figure 3:
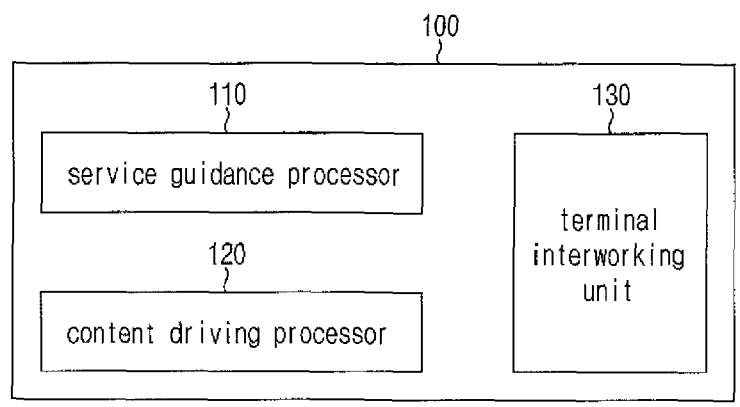
FIG. 3 illustrates a more detailed configuration of a service device according to an embodiment of the present disclosure.

As illustrated in FIG. 3, the service device 100 includes a service guidance processor 110 for transmitting a service menu to the terminal device 300, a content driving processor 120 for transmitting a content by executing an application, and a terminal interworking unit 130 for transmitting data received from the service guidance processor 110 and the content driving processor 120 to the terminal device 300 in a streaming type.

The service guidance processor 110 provides a step-by-step service menu for selecting a service to the terminal device 300.

More specifically, the service guidance processor 110 provides an initialized step-by-step service menu for selecting a service to the terminal device 300 which initially accesses the service device 100 according to an access induction of the service routing device 200. At this time, the service guidance processor 110 may provide a service menu to a limited number of terminal devices 300 and a service menu screen is provided to the terminal device 300 in a streaming type. The service menu is a service selection screen configured by a plurality of selectable steps, for example, an initial screen, a first menu screen according to the selection of the initial screen, and a content list screen through the selection of the first menu screen as illustrated in FIG. 2 and a user can move to a higher step or a lower step through a selection.

Further, the service guidance processor 110 receives a request for driving a content according to the selection of the service menu of a particular step from the terminal device 300.

More specifically, when the service guidance processor 110 receives a request for driving a content according to the selection of the service menu of a particular step from the terminal device 300, the service guidance processor 110 provides access information (for example, URL) of a particular service device, in which an application for providing the corresponding content is executed, to the terminal device 300. Further, the service guidance processor 110 additionally provides menu step information corresponding to the particular step of the service menu selected by the terminal device 300 to the terminal device 300 simultaneously with provision of the content access information.

In addition, the service guidance processor 110 initializes the step of the service menu provided to the terminal device 300 to switch a state of the service menu to a state where another terminal device can further access.

More specifically, the service guidance processor 110 initializes the step of the service menu provided to the terminal device 300 and maintains a state of the service menu 100 as a state where an additional access of another terminal device is possible until the driving of the content by the terminal device 300 is completed, so that the service guidance processor 110 provides a simultaneous access environment to a plurality of terminal devices.

Further, the service guidance processor 110 provides a service menu to a terminal device which accesses in a state where an additional access of another terminal device is possible.

More specifically, when another terminal device additionally accesses the service device 100 in a state where an additional access of another terminal device is possible according to the initialization of the step of the service menu, the service guidance processor 110 guides a cloud streaming service to another terminal device by providing the initialized step-by-step service menu to another terminal device. Further, when the terminal device 300 re-accesses the service device 100 based on the provided menu step information, the service guidance processor 110 may provide a guarantee of service continuity to the terminal device 300 by providing a service menu corresponding to the menu step information, that is, a service menu of a step finally selected by the terminal device 300.

Meanwhile, when the terminal device 300 accesses the service device 100 based on content access information, the content driving processor 120 transmits a requested content by executing an application.

More specifically, when the terminal device 300 accesses the service device 100 based on the provided content access information and makes a request for the content, the content driving processor 120 executes a VOD application which streams video/audio data if the content is a video/audio content, executes a game application which plays a game if the content is a game content to provide a content corresponding to a result value thereof to the terminal device 300, thereby reproducing a corresponding screen in the terminal device 300.

Hereinafter, a more detailed configuration of the terminal device 300 according to an embodiment of the present disclosure will be described with reference to FIG. 4.

Figure 4:
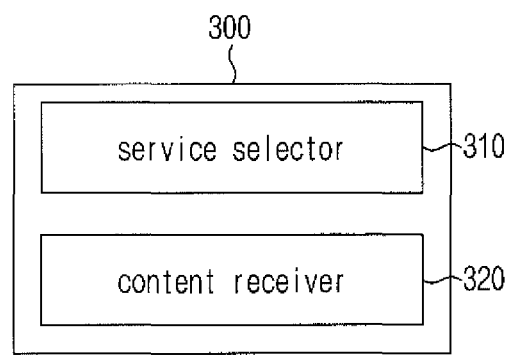
FIG. 4 illustrates a more detailed configuration of a terminal device according to an embodiment of the present disclosure.

As illustrated in FIG. 4, the terminal device 300 includes a service selector 310 for receiving a step-by-step service menu from the service device 100 and making a request for driving a content and a content receiver 320 for receiving the content based on content access information received from the service device 100 according to the request for driving the content.

The service selector 310 receives a step-by-step service menu according to an initial access to the service device 100.

More specifically, when the terminal device 300 initially accesses the service device 100 according to the access induction of the service routing device 200, the service selector 310 receives a step-by-step service menu for using the cloud streaming service from the service device 100 in a streaming type. As described above, the service menu is a service selection screen configured by a plurality of selectable steps, for example, an initial screen, a first menu screen according to the selection of the initial screen, and a content list screen through the selection of the first menu screen as illustrated in FIG. 2 and a user can move to a higher step or a lower step through a selection.

Further, the service selector 310 makes a request for driving a content by selecting a particular step based on the step-by-step service menu.

More specifically, the service selector 310 makes a request for driving the content based on the step-by-step service menu received from the service device 100 and receives content access information, for example, access information (for example, URL) of a particular service device, in which an application for providing the corresponding content is executed, from the service device 100 according to the driving request. Further, the service selector 310 additionally receives and stores menu step information corresponding to a particular step of the selected service menu simultaneously with the reception of the content access information.

In addition, the service selector 310 re-accesses the service device 100 and receives the service menu of the particular step corresponding to the received menu step information from the service device 100.

More specifically, when the driving of the content is completed or when a user request is received, the service selector 310 re-accesses the service device 100 based on the menu step information received from the service device 100 and receives a service menu of a finally selected step from the service device 100 according to the re-access, so as to receive a guarantee of service continuity. Meanwhile, when the terminal device 300 re-accesses the service device 100, the service selector 310 accesses the service device 100 according to the access induction of the service routing device 200. In connection with this, when the service routing device 200 induces the terminal device 300 to access another service device, the terminal device 300 provides menu step information to another service device, so that the terminal device 300 may receive the service menu of the final access step from another service device in the same way as the service device 100 which the terminal device 300 previously accessed.

The content receiver 320 receives the content based on the received content access information.

More specifically, when the terminal device 300 receives the content access information from the service device 100 according to the request for driving the content, the content receiver 320 terminates the access to the service device 100, accesses a particular service device having the application for providing the content among a plurality of service devices based on the content access information, and receives the corresponding content.

As described above, based on the cloud streaming-based service menu providing system according to the present disclosure, when the terminal device makes a request for driving a content based on a step-by-step service menu, the step of the service menu provided to the terminal device is initialized and the service menu is maintained in a state where another terminal device can additionally access until the driving of the corresponding content is completed, so that a simultaneous access environment can be provided to a plurality of terminal devices. Further, when the terminal device re-accesses in the future, a service menu of a step which the terminal device finally selects is provided, so that service continuity is guaranteed to an individual terminal device.

Figure 5:
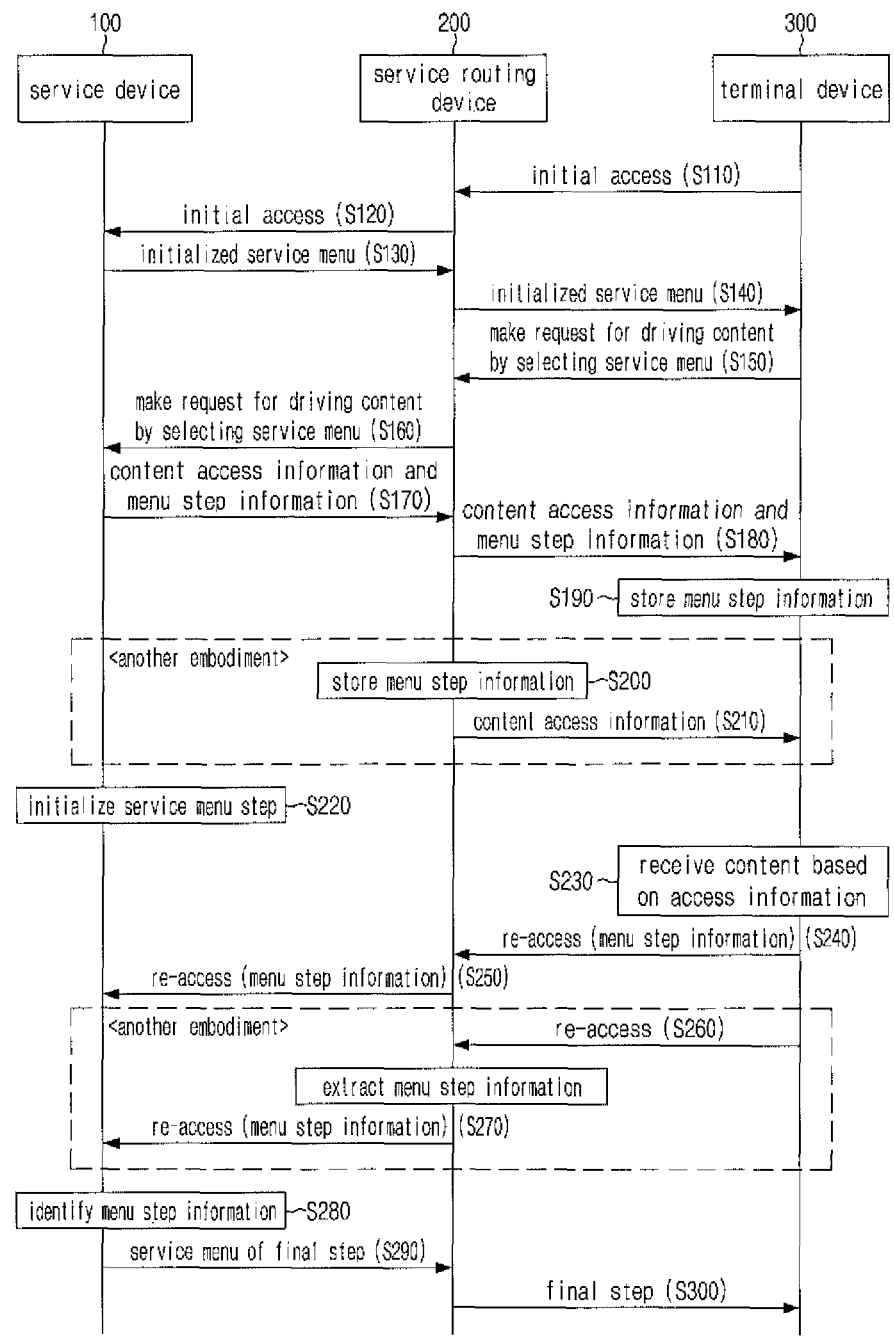
FIG. 5 is a flowchart illustrating an operation method of a cloud streaming-based service menu providing system according to an embodiment of the present disclosure.
Figure 6:
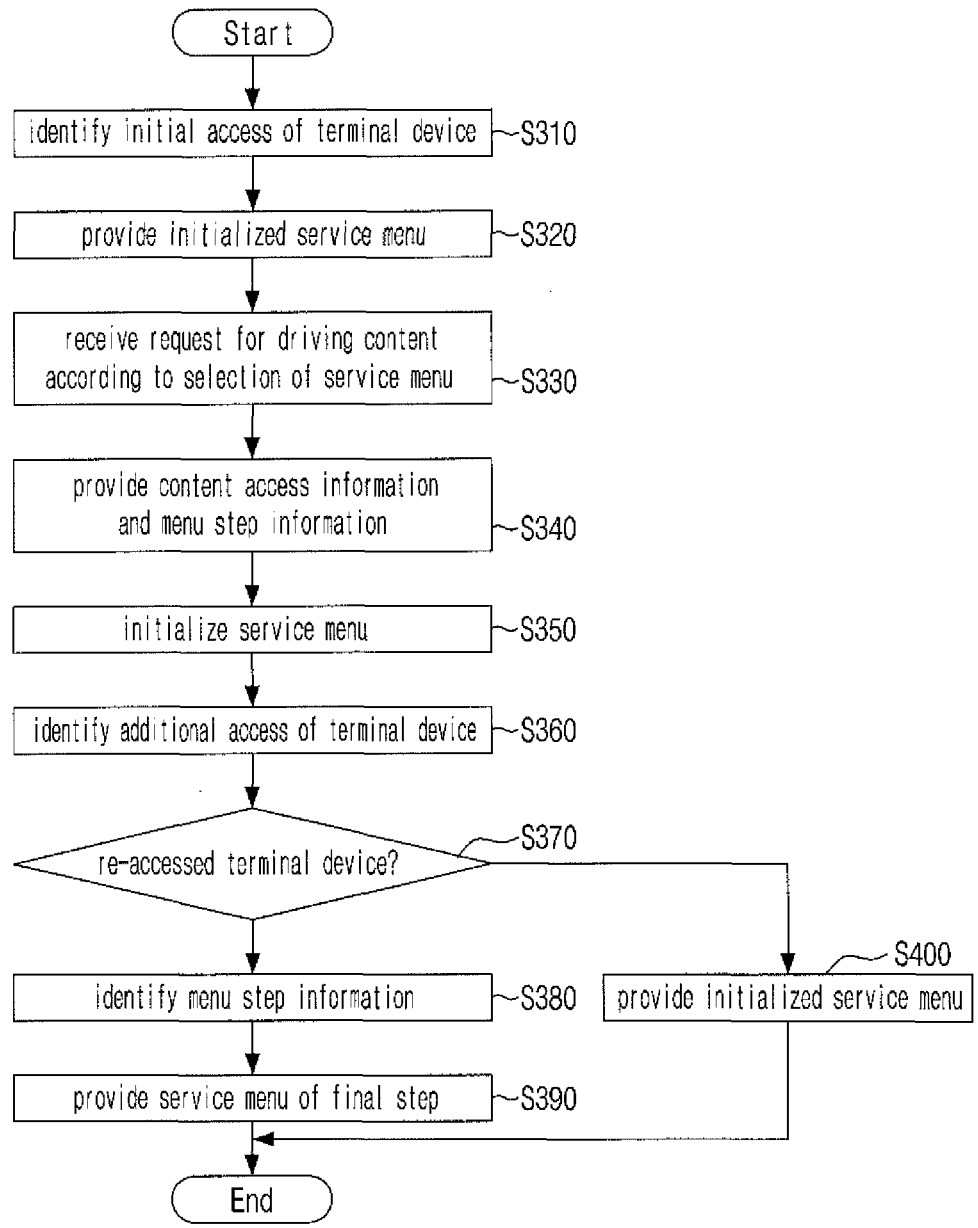
FIG. 6 is a flowchart illustrating an operation method of a service device according to an embodiment of the present disclosure.
Figure 7:
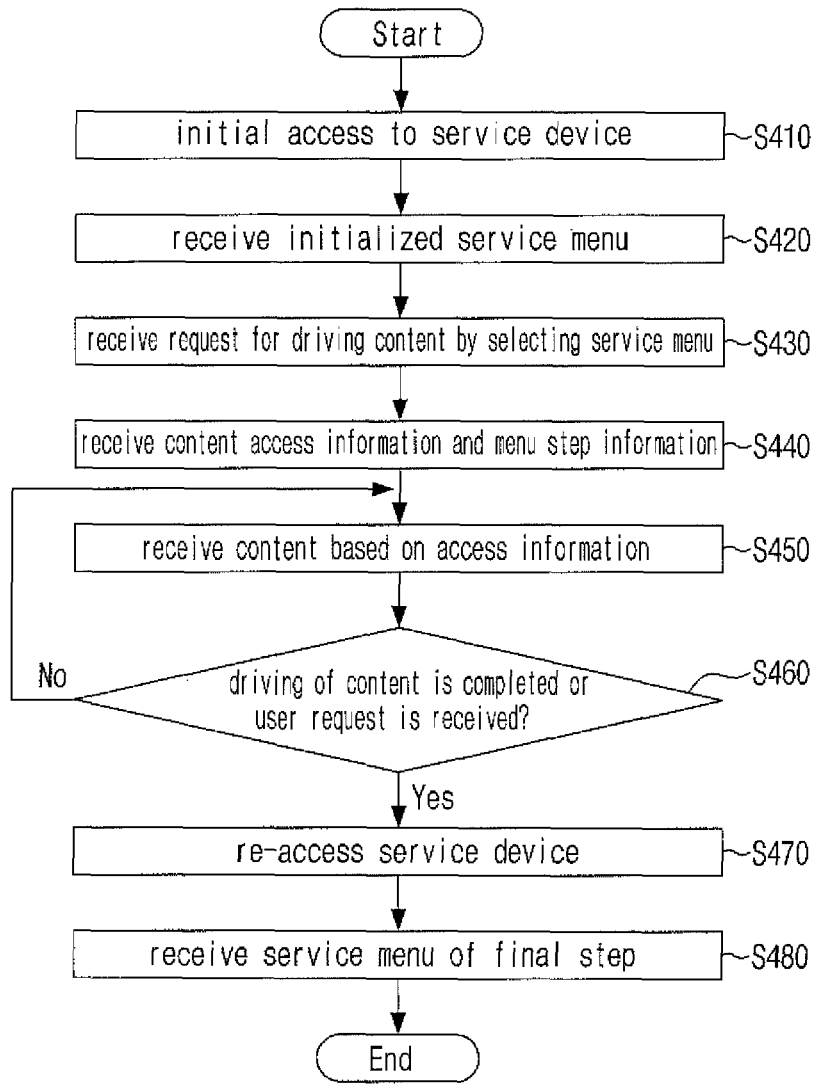
FIG. 7 is a flowchart illustrating an operation method of a terminal device according to an embodiment of the present disclosure.

Hereinafter, a cloud streaming-based service menu providing method according to an embodiment of the present disclosure will be described with reference to FIGS. 5 to 7. Configurations which have been described in FIGS. 1 to 4 are assigned the same corresponding reference numerals for the convenience of description.

First, an operation method of the cloud streaming-based service menu providing system according to an embodiment of the present disclosure will be described with reference to FIG. 5.

The service device 100 first provides a step-by-step service menu for selecting a service to the terminal device 300 in steps S110 to S140.

Preferably, the service device 100 provides an initialized step-by-step service menu for selecting a service to the terminal device 300 which initially accesses the service device 100 according to an access induction of the service routing device 200. At this time, the service device 100 may provide a service menu to a limited number of terminal devices 300 and a service menu screen is provided to the terminal device 300 in a streaming type. The service menu is a service selection screen configured by a plurality of selectable steps, for example, an initial screen, a first menu screen according to the selection of the initial screen, and a content list screen through the selection of the first menu screen as illustrated in FIG. 2 and a user can move to a higher step or a lower step through a selection.

Then, the terminal device 300 makes a request for driving a content by selecting a particular step based on the step-by-step service menu in steps S150 to S160.

Preferably, the terminal device 300 makes a request for driving the content by selecting a service menu of a particular step based on the step-by-step service menu.

Next, the service device 100 provides content access information and menu step information according to the request for driving the content by the terminal device 300 in steps S170 to S210.

Preferably, when the service device 100 receives a request for driving a content according to the selection of the service menu of a particular step from the terminal device 300, the service device 100 provides access information (for example, URL) of a particular service device, in which an application for providing the corresponding content is executed, to the terminal device 300. Further, the service device 100 additionally provides menu step information corresponding to the particular step of the service menu selected by the terminal device 300 simultaneously with provision of the content access information. At this time, the menu step information provided from the service device 100 is directly transmitted to the terminal device 300 through the service routing device 200 and stored in the terminal device 300 or is transmitted only to the service routing device 200 and stored in the service routing device 200. The stored menu step information is used when the terminal device 300 re-accesses the service device 100 in the future.

Then, the service device 100 initializes the step of the service menu provided to the terminal device 300 to switch a state of the service menu to a state where another terminal device can further access in step S220.

Preferably, the service device 100 initializes the step of the service menu provided to the terminal device 300 and maintains a state of the service menu as a state where an additional access of another terminal device is possible until the driving of the content by the terminal device 300 is completed, so that the service device 100 provides a simultaneous access environment to a plurality of terminal devices.

Next, the terminal device 300 receives the content based on the received content access information in step S230.

Preferably, when the terminal device 300 receives the content access information from the service device 100 according to the request for driving the content, the terminal device 300 terminates the access to the service device 100, accesses a particular service device having the application for providing the content among a plurality of service devices based on the content access information, and receives the corresponding content.

Thereafter, the terminal device 300 re-accesses the service device 100 and receives the service menu of the particular step corresponding to the received menu step information from the service device 100 in steps S240 to S300.

Preferably, when the driving of the content is completed or when a user request is received, the terminal device 300 re-accesses the service device 100 based on the menu step information received from the service device 100 and receives a service menu of a finally selected step from the service device 100 according to the re-access, so as to receive a guarantee of service continuity. Meanwhile, when the terminal device 300 re-accesses the service device 100, the terminal device 300 accesses the service device 100 according to the access induction of the service routing device 200. In connection with this, when the service routing device 200 induces the terminal device 300 to access another service device, the terminal device 300 provides menu step information to another service electronic device, so that the terminal device 300 may receive the service menu of the final access step from another service device in the same way as the service device 100 which the terminal device 300 previously accessed. At this time, the menu step information is stored in the terminal device 300, and is provided by the terminal device 300 when the terminal device 300 re-accesses the service device 100. Meanwhile, in another embodiment, menu step information provided from the service device 100 may be stored in the service routing device 300 instead of the terminal device 300. In connection with this, when the terminal device 300 makes a request for re-accessing the service device 100, the service routing device 200 operates as a subject to provide the menu step information, and accordingly, the service routing device 200 extracts the menu step information based on identification information of the accessed terminal device 300 and transmits the extracted menu step information to the service device 100 which the terminal device 300 accesses, so that the terminal device 300 may receive the service menu of the finally selected step.

Hereinafter, an operation method of the service device 100 according to an embodiment of the present disclosure will be described with reference to FIG. 6.

The service device 100 first provides a step-by-step service menu for selecting a service to the terminal device 300 in steps S310 to S320.

Preferably, the service guidance processor 110 provides an initialized step-by-step service menu for selecting a service to the terminal device 300 which initially accesses the service device 100 according to an access induction of the service routing device 200. At this time, the service guidance processor 110 may provide a service menu to a limited number of terminal devices 300 and a service menu screen is provided to the terminal device 300 in a streaming type. The service menu is a service selection screen configured by a plurality of selectable steps, for example, an initial screen, a first menu screen according to the selection of the initial screen, and a content list screen through the selection of the first menu screen as illustrated in FIG. 2 and a user can move to a higher step or a lower step through a selection.

Then, the service device 100 receives a request for driving a content according to the selection of the service menu of a particular step in steps S330 to S340.

Preferably, when the service guidance processor 110 receives a request for driving a content according to the selection of the service menu of a particular step from the terminal device 300, the service guidance processor 110 provides access information (for example, URL) of a particular service device, in which an application for providing the corresponding content is executed, to the terminal device 300. Further, the service guidance processor 110 additionally provides menu step information corresponding to the particular step of the service menu selected by the terminal device 300 to the terminal device 300 simultaneously with provision of the content access information.

Then, the service guidance processor 110 initializes the step of the service menu provided to the terminal device 300 to switch a state of the service menu to a state where another terminal device can further access in step S350.

Preferably, the service guidance processor 110 initializes the step of the service menu provided to the terminal device 300 and maintains a state of the service menu as a state where an additional access of another terminal device is possible until the driving of the content by the terminal device 300 is completed, so that the service device 100 provides a simultaneous access environment to a plurality of terminal devices.

Next, a service menu is provided to an accessed terminal device in a state where an additional access of another terminal device is possible in steps S360 to S400.

Preferably, when another terminal device additionally accesses the service device 100 in a state where an additional access of another terminal device is possible according to the initialization of the step of the service menu, the service guidance processor 110 guides a cloud streaming service to another terminal device by providing the initialized step-by-step service menu to another terminal device. Further, when the terminal device 300 re-accesses the service device 100 based on the provided menu step information, the service guidance processor 110 may provide a guarantee of service continuity to the terminal device 300 by providing a service menu corresponding to the menu step information, that is, a service menu of a step finally selected by the terminal device 300.

Hereinafter, an operation method of the terminal device 300 according to an embodiment of the present disclosure will be described with reference to FIG. 7.

The terminal device 300 first receives a step-by-step service menu according to an initial access to the service device 100 in steps S410 to S420.

Preferably, when the terminal device 300 initially accesses the service device 100 according to the access induction of the service routing device 200, the service selector 310 receives a step-by-step service menu for using the cloud streaming service from the service device 100 in a streaming type. As described above, the service menu is a service selection screen configured by a plurality of selectable steps, for example, an initial screen, a first menu screen according to the selection of the initial screen, and a content list screen through the selection of the first menu screen as illustrated in FIG. 2 and a user can move to a higher step or a lower step through a selection.

Then, the service selector 310 makes a request for driving a content by selecting a particular step based on the step-by-step service menu in steps S430 to S440.

Preferably, the service selector 310 makes a request for driving the content based on the step-by-step service menu received from the service device 100 and receives content access information, for example, access information (for example, URL) of a particular service device, in which an application for providing the corresponding content is executed, from the service device 100 according to the driving request. Further, the service selector 310 additionally receives and stores menu step information corresponding to a particular step of the selected service menu simultaneously with the reception of the content access information.

Then, the content receiver 320 receives the content based on the received content access information in step S450.

Preferably, when the content receiver 320 receives the content access information from the service device 100 according to the request for driving the content, the content receiver 320 terminates the access to the service device 100, accesses a particular service device having the application for providing the content among a plurality of service devices based on the content access information, and receives the corresponding content.

Thereafter, the service selector 310 re-accesses the service device 100 and receives the service menu of the particular step corresponding to the received menu step information from the service device 100 in steps S460 to S480.

Preferably, when the driving of the content is completed or when a user request is received, the service selector 310 re-accesses the service device 100 based on the menu step information received from the service device 100 and receives a service menu of a finally selected step from the service device 100 according to the re-access, so as to receive a guarantee of service continuity. Meanwhile, when the terminal device 300 re-accesses the service device 100, the service selector 310 accesses the service device 100 according to the access induction of the service routing device 200. In connection with this, when the service routing device 200 induces the terminal device 300 to access another service device, the terminal device 300 provides menu step information to another service device, so that the terminal device 300 may receive the service menu of the final access step from another service device in the same way as the service device 100 which the terminal device 300 previously accessed.

As described above, based on the cloud streaming-based service menu providing system according to the present disclosure, when the terminal device makes a request for driving a content based on a step-by-step service menu, the step of the service menu provided to the terminal device is initialized and the service menu is maintained in a state where another terminal device can additionally access until the driving of the corresponding content is completed, so that a simultaneous access environment can be provided to a plurality of terminal devices. Further, when the terminal device re-accesses in the future, a service menu of a step which the terminal device finally selects is provided, so that service continuity is guaranteed to an individual terminal device.

Meanwhile, a cloud streaming-based service menu providing method according to an embodiment of the present disclosure may be implemented in the form of program command which can be executed through various computer means and recorded in a computer-readable medium. The computer-readable medium may include a program command, a data file, and a data structure individually or a combination thereof. The program command recorded in the medium is specially designed and configured for the present invention, but may be used after being known to those skilled in computer software fields. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware devices may be configured to operate as one or more software modules to perform the operations of the present invention, and vice versa.

Further, a cloud streaming-based service menu system according to the present disclosure may include a processor, a memory, a storage device, and an input/output device. The processor may process a command for execution within the system. In one implementation, the processor may be a single-threaded processor. In another implementation, the processor may be a multi-threaded processor. The processor can process a command stored in the memory or the storage device.

The memory stores information in the system. In one implementation, the memory is a computer-readable medium. In one implementation, the memory may be a volatile memory unit. In another implementation, the memory may be a non-volatile memory unit. The storage device may provide a large capacity storage unit of the system. In one implementation, the storage device is a computer-readable medium. In various different implementations, the storage device may include, for example, a hard disk device, an optical disk device, and other large capacity storage devices.

The input/output device provides an input/output operation of the system. In one implementation, the input/output device may include one or more network interface devices such as an Ethernet card, for example, a serial communication device such as an RS-232 port and/or a wireless interface device such as a 802.11 card. In another implementation, the input/output device may include a driver device, such as a keyboard, a printer, and a display device, configured to transmit output data to another input/output device and receive input data.

The function and process described in the specification may be implemented by a command to perform the function and process. For example, the command may include an interpreted command such as a script command, for example, a JavaScript or ECMAScript command, an executable code, or other commands stored in a computer-readable medium. The system according to the present disclosure may be implemented in a distributed manner over a network, such as a server farm or may be implemented in a single computer device.

Although an example process system has been described in the specification and drawings, implementations of the functional operations described in the specification may be implemented in other types of digital electronic circuits, or in computer software, firmware, or hardware including the structures disclosed in the specification and structural equivalents thereto, or in a combination of one or more thereof.

Implementations of the subject matter described in the specification may be implemented in one or more computer program products, that is, one or more modules related to a computer program command encoded on a tangible program storage medium to control an operation of a processing system or the execution by the operation. A computer-readable medium may be a machine-readable storage device, a machine-readable storage substrate, a memory device, a composition of materials influencing a machine-readable radio wave signal, or a combination of one or more thereof.

The terms "processing system", "processing device", and "lower system" encompass, for example, a programmable processor, a computer, or all kinds of apparatuses, devices, and machines including a multi processor or a computer to process data. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

Implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Although the present disclosure has been described in detail with reference to exemplary embodiments, the present disclosure is not limited thereto and it is apparent to those skilled in the art that various modifications and changes can be made thereto without departing from the scope of the present disclosure.

INDUSTRIAL APPLICABILITY

According to a system and a method of providing a cloud streaming-based service menu according to the present disclosure, when a request for driving a content based on a step-by-step service menu is received from a terminal device, the step of the service menu provided to the terminal device is initialized and thus a state of the service menu is maintained as a state in which an additional access of another terminal device is possible until the driving of the corresponding content is completed, so that a simultaneous access environment can be provided to a plurality of terminal device. When the terminal re-accesses in the future, a service menu of a step which the terminal device finally selects is provided, so that service continuity is guaranteed to each of the terminal devices. Accordingly, the present disclosure surpasses the limit of the related arts. Therefore, related technologies of the present disclosure can be used and also the device to which the present disclosure is applied has a high probability of entering into the market and being sold. Further, the present disclosure can be obviously implemented in reality and thus is highly applicable to the industries.

What is claimed is:

1. A system for providing a service menu to a first terminal device based on cloud streaming, the system comprising:
   a service device configured to provide a step-by-step service menu for selecting a service, provide content access information and menu step information corresponding to a particular step when a request for driving a content according to a selection of the particular step of the step-by-step service menu is made, and initialize a step of the step-by-step service menu;
   wherein the first terminal device is configured to access the service device to receive the step-by-step service menu, select the particular step of the step-by-step service menu to make the request for driving the content, and terminate the access to the service device and receive the content based on the content access information when receiving the content access information and the menu step information from the service device in response to the request for driving the content, and wherein the service device is further configured to switch a state of the step-by-step service menu to a state for providing additional access to a second terminal device such that when the second terminal device is accessed, the service device provides the initialized step-by-step service menu to the second terminal device, and when the first terminal device re-accesses, the service device provides the step-by-step service menu of the particular step corresponding to the menu step information.

2. A service device comprising:

a service guidance processor configured to transmit a step-by-step service menu for selecting a service for the first terminal device, and transmit content access information and menu step information corresponding to a particular step when a request for driving a content is received according to a selection of the particular step of the step-by-step service menu from the first terminal device; and a content driving processor configured to transmit the content when the first terminal device accesses the content access information, wherein the service guidance processor initializes a step of the step-by-step service menu transmitted to the first terminal device and switch a state of the step-by-step service menu to a state for providing additional access to a second terminal device, and wherein the service guidance processor transmits the step-by-step service menu of the particular step corresponding to the menu step information when the first terminal device re-accesses.

3. A terminal device comprising:

a service selector configured to select a particular step of a step-by-step service menu provided from a service device according to an initial access to the service device to make a request for driving a content, and receive content access information and menu step information corresponding to the particular step according to the request for driving the content; and a content receiver configured to, when the content access information is received from the service device, terminate the access to the service device to initialize a step of the step-by-step service menu to access another terminal device, and receive the content based on the content access information; and wherein when the terminal device re-accesses the service device based on the received menu step information, the service selector receives the step-by-step service menu of the particular step corresponding to the menu step information from the service device.

4. The terminal device of claim 3, wherein, when the terminal device initially accesses another service device, the service selector receives the service menu of the particular step corresponding to the menu step information from the another service device.

5. A method of providing a service menu to a terminal device based on cloud streaming, the method comprising:

using the terminal device to initially access a service device for providing a step-by-step service menu for selecting a service to the terminal device;

using the terminal device to select a particular step of the step by step service menu to make a request for driving a content to the service device;

when the request for driving the content is made, providing content access information and menu step information corresponding to the particular step to the terminal device by the service device;

using the service device for initializing a step of the step-by-step service menu provided to the terminal device to switch a state of the step-by-step service menu to a state for providing additional access to another terminal device;

receiving the content based on the content access information in a state where the terminal device terminates the access to the service device;

using the service device for providing the initialized step-by-step service menu to the accessed another terminal device; and when a re-access of the terminal device is identified, providing the step-by-step service menu of the particular step corresponding to the menu step information.

6. A method of operating a service device, the method comprising:

transmitting a step-by-step service menu for selecting a service to a terminal device;

when a request for driving a content according to a selection of a particular step of the step-by-step service menu is received from the terminal device, transmitting content access information and menu step information corresponding to the particular step;

initializing a step of the step-by-step service menu transmitted to the terminal device to switch a state of the service menu to a state for providing access to of another terminal device; and when the another terminal device additionally accesses, transmitting the initialized step-by-step service menu to the another terminal device.

7. The method of claim 6, further comprising, after the initializing the step of the step-by-step service menu, transmitting the step-by-step service menu of the particular step corresponding to the menu step information when the terminal device re-accesses based on the provided menu step information.

8. A method of operating a terminal device, the method comprising:

receiving a step-by-step service menu from a service device according to an initial access to a service device;

making a request for driving a content by selecting a particular step of the step-by-step service menu;

receiving content access information and menu step information corresponding to the particular step according to the request for driving the content;

terminating the access to the service device to initialize a step of the step-by-step service menu for providing additional access to another terminal device and receiving the content based on the content access information; and when the terminal device re-accesses, receiving the step-by-step service menu of the particular step corresponding to the menu step information from the service device.

9. A non-transitory computer-readable recording medium for storing a computer program in a terminal device for executing a process comprising:

initially accessing a service device for transmitting a step-by-step service menu for selecting a service for the terminal device;

when receiving a request from the terminal device for driving a content according to a selection of a particular step of the step-by-step service menu, transmitting by the service device content access information and menu step information corresponding to the particular step to the terminal device;

using the service device for initializing a step of the step-by-step service menu transmitted to the terminal device to switch a state of the step-by-step service menu to a state for providing additional access to another terminal device;

receiving the content based on the content access information in the state wherein the terminal device terminates access to the service device;

providing the initialized step-by-step service menu to the other accessed terminal device by the service device; and when a re-access of the terminal device is identified, providing the step-by-step service menu of the particular step corresponding to the menu step information.

* * * * *